Sept. 9, 1969     E. OROPEZA ET AL     3,465,504
AIR PURIFIER DEVICE
Filed Oct. 26, 1967
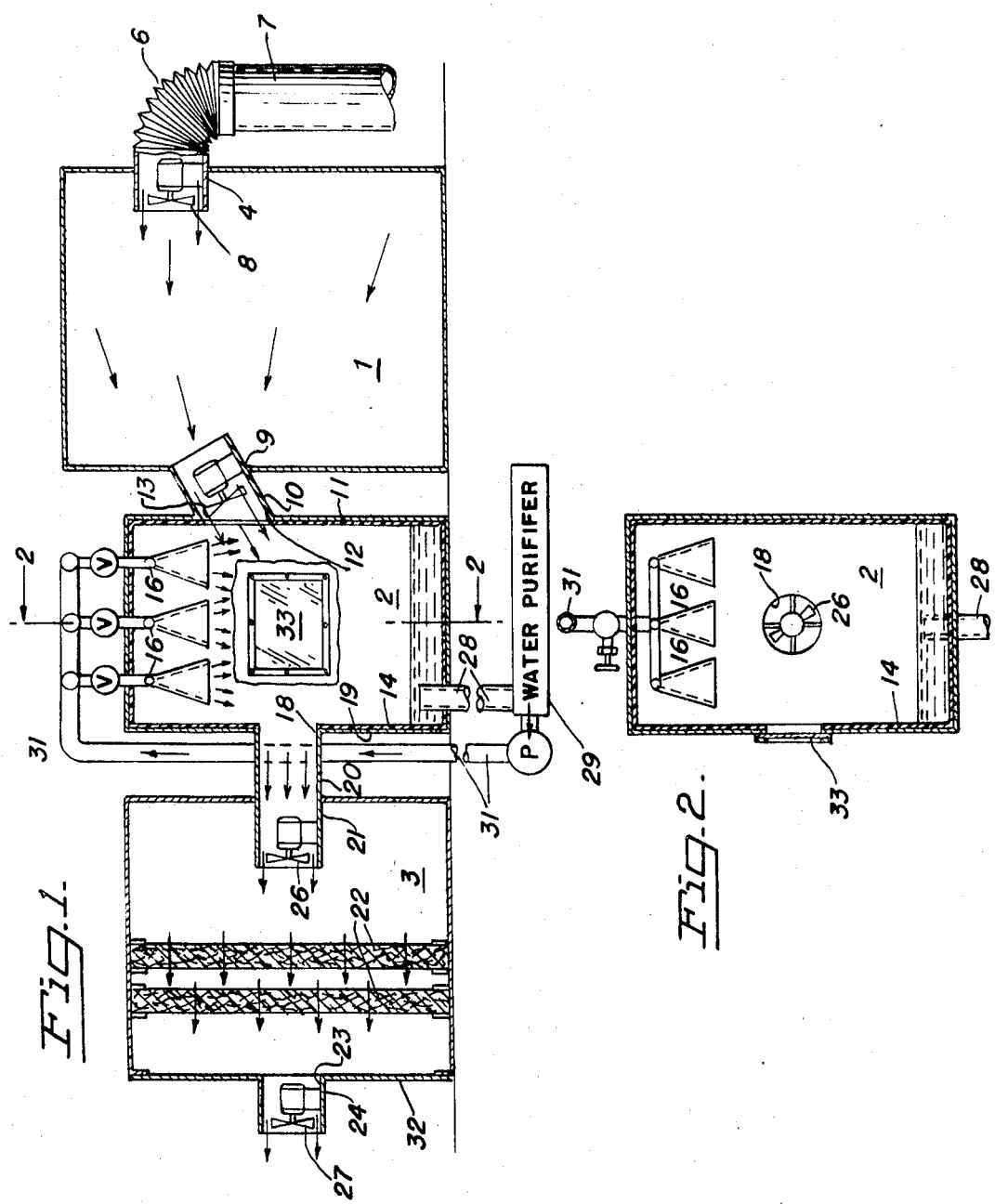
INVENTORS
ESTHER OROPEZA
VIOLET E. OROPEZA
BY George B White
ATTORNEY United States Patent Office 3,465,504
Patented Sept. 9, 1969

3,465,504
AIR PURIFIER DEVICE
Esther Oropeza and Violet E. Oropeza, both of 873 W. Hedding St., San Jose, Calif. 95126
Filed Oct. 26, 1967, Ser. No. 678,254
Int. Cl. B01d 47/16, 47/02
U.S. Cl. 55—228                                    1 Claim

ABSTRACT OF THE DISCLOSURE

In an air purifier device three chambers connected in series, and fans to draw air through the chambers in sequence. The first chamber is a collection chamber, the second has a spraying system for a fine mist to precipitate tiny particles from the air, and it is lined with plastic; and the third chamber has filters across its passage. The intake of the collection chamber is connected to a stack discharging air containing the waste materials from a plant.

BRIEF DESCRIPTION OF THE INVENTION

The purifier device of this invention includes three chambers in sequence each chamber having an inlet and an outlet. A flexible conduit is connected to the intake of the first chamber; a conduit connects the exhaust of the first chamber with the intake of the second chamber and another conduit connects the exhaust of the second chamber with the intake of the third chamber; and an exhaust conduit is connected to the exhaust of the third chamber. At the intake of the first chamber, and in each connecting conduit and in the exhaust conduit there are suction fans and blowers respectively which move the air inwardly and through the chambers to the exhaust. The second chamber is plastic lined and is provided with a plurality of sprays to produce a fine mist to precipitate even fine particles from the air. The third chamber filters the washed air, thereby the residual impurities and fumes are collected, precipitated and filtered out of the air, and the exhaust air is free of fumes and other impurities. The device is compact and very simple in operation.

DESCRIPTION OF FIGURES

FIG. 1 is a cross-sectional view of the device.
FIG. 2 is a sectional view of the second chamber of the device, the section being taken on lines 2—2 of FIG. 1.

DETAILED DESCRIPTION

In the illustrative embodiment of the invention there are three chambers connected in series. The first chamber is a collection or plenum chamber 1, the second chamber is a washing or precipitating chamber 2, and the third chamber is a filtering chamber 3.

The collection chamber has an intake 4 to which is connected a flexible tube 6. The other end of the flexible tube 6 is connected to a flue or stack 7. A suction fan and blower 8 is provided in the intake 4 of the collection chamber 1 and is driven electrically to suck the air through the flexible tube 6 and force it into the collection chamber 1. An outlet 9 is in the wall of the collection chamber 1 farthest from the intake 4.

A connecting conduit 10 connects the outlet 9 of the first or collection chamber 1 to the intake 12 in the adjacent wall 11 of the washing chamber 2. A suction fan and blower 13 is provided in the connecting conduit 10 and is electrically driven to suck air from the collection chamber 1 into and blow it through the washing chamber 2. The washing chamber 2 has a suitable complete plastic lining 14 all around. On the top of the washing chamber 2 are a plurality of nozzles 16 suitably connected to water under pressure so that the nozzles 16 spray a fine mist of a water curtain across the entire washing chamber 2. The spray nozzles 16 are arranged in such positions that the air must pass through the mist curtain as it is forced from the intake 12 to an outlet 18 of the washing chamber 2. The outlet 18 is in the wall 19 opposite the wall 11 in which the intake 12 is located.

A connecting conduit 20 connects the outlet 18 of the washing chamber 2 to the intake 21 of the filter chamber 3. The filter chamber has in it a plurality of suitable air filters 22, in which residual impurities from the air are precipitated. The filtering chamber 3 has an outlet 23 which is in axial alignment with the intake 21.

An exhaust conduit 24 discharges the washed and filtered air into the atmosphere. An electrically driven suction fan and blower 26 is located in the connecting conduit 20 and an electrically driven suction fan and blower 27 is located in the exhaust conduit 24 so as to force the air through the filters 22 and out through the exhaust conduit 24.

The herein device is particularly adapted for industrial use although it may be used wherever the exhaust is heavily contaminated by fumes or the like. The size of the collection chamber conforms to the size of the stack and the volume of discharge. In the washing chamber 2 the water spraying system produces a fine mist which precipitates minute particles from the air. A drain system is provided in the washing chamber 2 spaced from the bottom at a distance corresponding to the desired water level in the washing chamber 2. When the water accumulated in the bottom of the washing chamber 2 attains a predetermined level, then the chamber drains itself through a drain 28 connected to a suitable water purifier and recirculating system 29, which latter is connected by an intake conduit 31 to the nozzles 16. The plastic coating 14 in the washing chamber 2 eliminates the formation of rust. The recirculation of the water eliminates excessive use or waste of water. The outlet wall 32 of the filter chamber 3 is removable to facilitate the replacement of the filters. The washing chamber 2 has an observation window 33 on a side thereof.

The device is simple in structure and operation, it reduces pollution of air, it operates automatically, it is easily repaired and cleaned and it is eminently adapted for its purpose.

We claim:
1. In an air purifier device:
   (a) a collection chamber for receiving impure air, being enclosed by side walls, a top and a bottom and having an intake and an outlet through opposite side walls,
   (b) means to connect the intake of the said collection chamber to a discharge stack for conducting impure air,
   (c) an air washing chamber for washing air passed therethrough, being enclosed by side walls, a top and a bottom, and having an intake through its side wall adjacent the outlet of said collection chamber, and an outlet on its opposite side wall,
   (d) a first duct connecting the intake of said washing chamber to the outlet of said collection chamber,
   (e) a filter chamber for filtering air passed therethrough being enclosed by side walls, a top and a bottom, and having an inlet through the side wall adjacent the outlet of said washing chamber, and an outlet through its opposite side wall,
   (f) a second duct connecting the inlet of the filter chamber to the outlet of the washing chamber,
   (g) the inlet and outlet of said collection chamber being between the middle and the top of the collection chamber,

(h) the intake of the air washing chamber being lower than the outlet of the collection chamber whereby the first duct is inclined downwardly toward said air washing chamber and directs air flow inwardly and downwardly into said washing chamber, (i) the outlet of said washing chamber and the inlet of said filter chamber being at about the same level whereby the second duct is generally horizontal, directing air flow substantially horizontally through said filter chamber, (j) the outlet of said filter chamber being in substantial axial registry with the inlet of the filter chamber, (k) an air blower in each of the respective connecting ducts to blow air through the respective inlets, (l) means connecting the bottom of said washing chamber with top of said washing chamber for purifying and recirculating water above a predetermined level in the washing chamber including spray nozzles on the top of said washing chamber forming fine precipitating mist curtains between the inlet and outlet of said air washing chamber, and (m) air filter elements between and generally at right angles to the axis of the inlet and outlet of said filter chamber.

References Cited

UNITED STATES PATENTS

| | | | |
|---|---|---|---|
| 517,297 | 3/1894 | Reiss | 261—17 |
| 1,968,778 | 7/1934 | Caldwell | 55—257 |
| 2,677,368 | 5/1954 | Janecek | 261—118 |
| 2,998,097 | 8/1961 | Baxter | 55—259 |
| 600,048 | 3/1898 | Terrell | 261—117 |
| 1,078,659 | 11/1913 | Barry | 261—118 |
| 1,976,629 | 10/1934 | Parkinson | 55—220 |
| 1,985,910 | 1/1935 | Anderson | 55—258 |
| 2,083,468 | 6/1937 | Nahigyan | 55—220 |
| 2,484,277 | 10/1949 | Fisher | 55—228 |
| 3,063,686 | 11/1962 | Irvin | 261—118 |
| 3,180,071 | 4/1965 | Nolte | 55—472 |
| 3,212,232 | 10/1965 | McMinn | 55—186 |
| 3,237,777 | 3/1966 | Brown et al. | 55—435 |
| 3,246,452 | 4/1966 | Arvanitaksis | 55—259 |
| 3,353,337 | 11/1967 | Gale | 55—232 |

HARRY B. THORNTON, Primary Examiner

B. NOZICK, Assistant Examiner

U.S. Cl. X.R.

55—259, 274, 421, 435, 472; 261—17, 72, 118